United States Patent
Sergeev

(10) Patent No.: US 11,162,023 B2
(45) Date of Patent: Nov. 2, 2021

(54) METHOD FOR TREATMENT OF BOTTOMHOLE FORMATION ZONE

(71) Applicant: LIMITED LIABILITY COMPANY "VI-ENERGY", Moscow (RU)

(72) Inventor: Vitalii Vyacheslavovich Sergeev, Moscow (RU)

(73) Assignees: LIMITED LIABILITY COMPANY "VI-ENERGY", Moscow (RU); NISSAN CHEMICAL CORPORATION, Tokyo (JP)

( * ) Notice: Subject to any disclaimer, the term of this patent is extended or adjusted under 35 U.S.C. 154(b) by 117 days.

(21) Appl. No.: 16/329,856

(22) PCT Filed: Feb. 21, 2017

(86) PCT No.: PCT/RU2017/000086
§ 371 (c)(1),
(2) Date: Mar. 1, 2019

(87) PCT Pub. No.: WO2018/044200
PCT Pub. Date: Mar. 8, 2018

(65) Prior Publication Data
US 2019/0241797 A1    Aug. 8, 2019

(30) Foreign Application Priority Data
Sep. 2, 2016 (RU) .................. 2016135679

(51) Int. Cl.
*C09K 8/76* (2006.01)
*C09K 8/92* (2006.01)
*C09K 8/72* (2006.01)
*C09K 8/57* (2006.01)

(52) U.S. Cl.
CPC ........... *C09K 8/92* (2013.01); *C09K 8/57* (2013.01); *C09K 8/72* (2013.01); *C09K 2208/10* (2013.01)

(58) Field of Classification Search
CPC ... C09K 8/92; C09K 8/57; C09K 8/72; C09K 2208/10; C09K 8/82; C09K 8/845; C09K 8/516; C09K 8/502; C09K 8/5045; C09K 8/504; C09K 8/76; C09K 2208/14; E21B 43/16; Y10S 507/927; Y10S 507/935
See application file for complete search history.

(56) References Cited

U.S. PATENT DOCUMENTS

| | | | | |
|---|---|---|---|---|
| 6,068,054 A | * | 5/2000 | Bragg | C09K 8/26 166/270 |
| 2009/0211758 A1 | | 8/2009 | Bragg et al. | |
| 2014/0116695 A1 | * | 5/2014 | Maghrabi | C09K 8/74 166/279 |

FOREIGN PATENT DOCUMENTS

RU    2583104    *    5/2016

OTHER PUBLICATIONS

Liuxiange Volume of Essays of Oil Production Engineering written by Liuxiange, Beijing, Petroleum Industry Press, p. 50, item 2. Published Mar. 31, 1999.

* cited by examiner

*Primary Examiner* — Kumar R Bhushan
(74) *Attorney, Agent, or Firm* — Nath, Goldberg & Meyer; Jerald L. Meyer

(57) ABSTRACT

Methods for intensification of oil production with the aim of increasing the oil recovery factor include the sequential treatment of BHZ with an emulsion, limiting water inflows by artificially reducing the permeability of highly permeable intervals of the reservoir, an oil pack, and preventing the interaction of the emulsion with an acid composition, which is injected after. The wettability of reservoir rock in the BHZ is preliminarily determined, and in the case of hydrophilicity of the reservoir rock a direct type of the emulsion with the following composition is used, % mass.: hydrocarbon phase—20-25, emulsifier—3-5, colloidal silicon dioxide nanoparticles—0.5-3, aqueous phase—rest. In the case of hydrophobicity of the reservoir rock in use the invert type of emulsion of the following composition, % mass.: hydrocarbon phase—40-45, emulsifier—3-5, colloidal silicon dioxide nanoparticles—1-3, aqueous phase—rest.

5 Claims, 4 Drawing Sheets

| Well number | Before treatment ||| After treatment |||
|---|---|---|---|---|---|---|
| | Fluid rate, m³/day | Oil rate, t/day | Water-cut, % | Fluid rate, m³/day | Oil rate, t/day | Water-cut, % |
| 806 | 46,2 | 2,6 | 95,0 | 45 | 4,7 | 85,0 |
| 335 | 19,4 | 1,6 | 93,5 | 23,0 | 3,15 | 81,5 |
| 203 | 3,5 | 1,5 | 48,0 | 3,3 | 2,7 | 26,5 | ature of the claimed invention is to increase
METHOD FOR TREATMENT OF BOTTOMHOLE FORMATION ZONE

FIELD

This is a National Phase Application filed under 35 U.S.C. 371 as a national stage of PCT/RU2017/000086, filed Feb. 21, 2017, an application claiming the benefit of Russian Application No. RU2016135679, filed Sep. 2, 2016, the content of each of which is hereby incorporated by reference in its entirety.

BACKGROUND

The invention relates to the oil industry, in particular to the methods for intensification of oil production with the aim of increasing the oil recovery factor.

One of the ways to increase the efficiency of the methods for oil production intensification is the use of complex technologies for treatment the bottomhole formation zone (BHZ). One of this type technologies is presented by the author of this development in the patent of the Russian Federation for invention No. 2583104 (patentee Sergeev V. V., IPC E21B 43/27, E21B 33/138, published on 10 May 2016), adapted for the prototype. The technology consists in combining two types of BHZ treatments. Combining results in a synergistic effect. The impact is performed by stages: the first stage is the treatment of high-permeable BHZ intervals with invert-emulsion solution (IES), the second stage is the treatment of low-permeable BHZ intervals by acid composition. In this case, IES contains, vol. %: emulsifier—2, the hydrocarbon phase (diesel fuel)—20, the aqueous phase—the rest.

One of the main features of the technology is the selectivity of the impact. The use of IES to limit water inflows from highly permeable areas of the reservoir provides blocking only water-saturated BHZ intervals. The ability of the IES to reduce viscosity when interacting with the hydrocarbon phase prevents clogging of low-permeable intervals. The blocking of water-saturated intervals by IES provides an effective impact of acid composition on low-permeable intervals of BHZ.

According to the results of 6 months monitoring of the treated wells operation within an oilfield test of the technology for the intensification of oil production it was determined that the period of positive technological effect is in average 4 months. FIG. 1 shows a table reflecting the average values of the wells' performance indicators (Pashninskoe oilfield) after the treatment. In average, after 4 months wells water-cut again increased to the level which was before the treatment.

The disadvantage of this method is not high enough IES stability in reservoir conditions.

The prior art composition for the treatment of underground oil reservoirs, containing a colloidal solution of silica nanoparticles with a diameter of from 4 to 300 nm (patent WO 2007135617 A1, patent holders SCHLUMBERGER CA LTD, SCHLUMBERGER SERVICES PETROL, SCHLUMBERGER HOLDINGS, SCHLUMBERGER TECHNOLOGY BV, PRAD RES & DEV NV, ODEH NADIR M M, CHAABOUNI HASSAN, CHAN KENG SENG, ENKABABIAN PHILIPPE, IPC C09K 8/504, C09K 8/506, C09K 8/516, publication date 29 Nov. 2007). The known composition forms a gel with a delay in time. A hydroxyl donor necessary for gelation is present in the oil reservoir, which at elevated temperatures releases hydroxyl groups and thereby contributes to the formation of a gelling agent. As a result, the composition blocks aquifer formation intervals.

The disadvantage of this composition is the necessity to use detonating donors hydroxyls, which should be pre-pumped into the BHZ. In the case of treating the absorbing intervals, the composition will not be effective, since low viscosity solution of detonating hydroxyl donor will go through absorbing intervals to the reservoir deep and will not block the absorbing intervals. Also a disadvantage is the need to create a high temperature to trigger a reaction for formation of gel.

The prior art a method of producing hydrocarbons from a subterranean formation, including the treatment of the BHZ of injection wells with an invert-emulsion solution in order to push the oil to production wells (patent US 2006040661 A1, patent holders CHOI HYUNG-NAM, ECKERT MICHAEL, LUFT ACHIM, IPC H04L 12/28, H04L 29/06, H04W 48/16, H04W 88/06, H04W 84/04, H04W 84/12, publication date 29 Nov. 2007). The invert-emulsion solution contains a hydrocarbon phase, an aqueous phase and solid particles, which can be used as colloidal silicon dioxide nanoparticles with a particle diameter of 10-20 nanometers. Known invention is achieved by increasing the stability of the emulsion and the efficiency of hydrocarbon displacement.

The disadvantage of this composition is the need to saturate the hydrocarbon phase of the emulsion by gas. This complicates the process of preparing the composition and requires the use of special equipment. The known method is not intended for treating the BHZ of production wells, but only for injection.

SUMMARY

The technical result of the claimed invention is to increase the stability of the emulsion for complex technology for the intensification of oil production, obtaining additional oil production, increase efficiency in wells with high flow rates due to the selective blocking of the water-saturated intervals by high-stable water-blocking agent.

The essence of the invention lies in the sequential treatment of BHZ with an emulsion, limiting water inflows by artificially reducing the permeability of highly permeable intervals of the reservoir, an oil pack, which is a buffer and preventing the interaction of the emulsion with an acid composition, which is injected after. In this case, the wettability of reservoir rock in the BHZ is preliminarily determined, and in the case of hydrophilicity of the reservoir rock a direct type of the emulsion with the following composition is used, % mass.: hydrocarbon phase—20-25, emulsifier—3-5, colloidal silicon dioxide nanoparticles—0.5-3, aqueous phase—rest. In the case of hydrophobicity of the reservoir rock in use the invert type of emulsion of the following composition, % mass.: hydrocarbon phase—40-45, emulsifier—3-5, colloidal silicon dioxide nanoparticles—1-3, aqueous phase—rest. The colloidal silicon dioxide nanoparticles contains, % mass.: colloidal silicon dioxide in acrylic acid—40, propylene glycol monomethyl ether—59.5, water—the rest.

As an emulsifier, an emulsifier of the brand Sinol EM™ or Sinol EMI™ can be used. As a hydrocarbon phase diesel fuel or prepared oil from the oil gathering station in use. The brand Sinol EM™ is a 40% solution of esters of oleic, linoleic, linolenic and resin acids in diesel fuel, with the additives of a high molecular weight organic thermal stabilizer and alkyldimethylamine oxide. Sinol EMI™ is an emulsifier-corrosion inhibitor for oil production, consisting of hydrocarbons and fatty acid amidoamines.

As an aqueous phase a water solution of calcium chloride or sodium chloride in use.

BRIEF DESCRIPTION OF THE DRAWINGS

The invention is illustrated by the following graphic materials.

DETAILED DESCRIPTION

In order to develop highly stable emulsion solutions, which increase the efficiency of the methods for intensification of oil production, experiments have been conducted to study the viscosity properties of two types of emulsion (direct and invert) with the addition of silicon dioxide nanoparticles, and to determine the thermal stability of the developed systems.

Laboratory experiments to study the dynamic viscosity properties of the emulsion were carried out on a DV-E VISCOMETER "BROOKFIELD" instrument.

Before conducting the experiments a samples of the basic emulsions have been prepared by using the device "CAT R50 D" for 15 min mixing the basic emulsion components: diesel fuel, emulsifier, and the model of reservoir water (water solution of calcium chloride ($CaCl_2$) or sodium chloride (NaCl) with a density of 1100 kg/m$^3$).

Figures 1, 2:
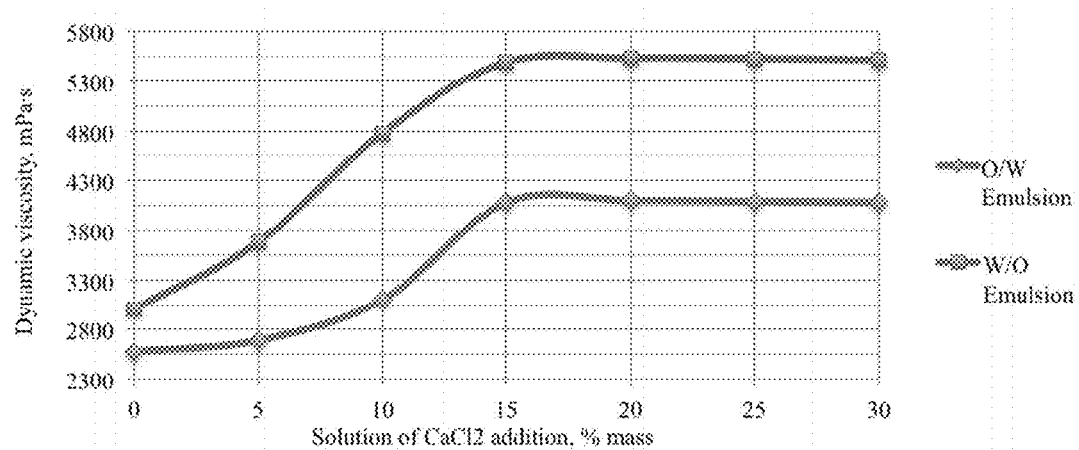
FIG. 1 shows a table reflecting the average values of the wells' main operational indicators (Pashninskoe oilfield) after treatment with the technology according to the prototype.
FIG. 2 shows the dependence of the viscosities of the basic direct and invert emulsion on the content of the mineralized water solution at a spindle rotation speed of 30 rpm.

In order to determine the changes in the dynamic viscosity of the basic direct and invert emulsion types, the samples were mixed with the model of reservoir water (water solution of $CaCl_2$ with a density of 1100 kg/m$^3$). The model of reservoir water was added to the samples at 20° C. in volumes, % vol.: 5; 10; 15; 20; 25; 30 (FIG. 2).

After the measuring of the basic emulsions viscosity properties experiments were conducted with the aim to determine the direct and invert emulsion samples viscosity dependence on the content of silicon dioxide nanoparticles, optimal concentration of nanoparticles in the different type of emulsion when samples are mixed with additional volume of the reservoir water, and stability of the samples.

In total 12 samples of the direct and invert emulsion were prepared for the research. The samples content of colloidal silicon dioxide nanoparticles as following, % mass.: 0.5, 1.0, 2.0, 3.0, 4.0, 5.0. After that, the model of reservoir water was added in each of the sample in the following volumes, % vol.: 5, 10, 15, 20, 25, 30. The compositions were mixed on a magnetic stirrer "CAT R50 D" for 30 min, and then measurements of the viscosity properties have been performed. Experiments were conducted at a temperature of 20° C.

The type of emulsion (direct or invert) is chosen depending on the wettability characteristics of reservoir rock.

In the case of the hydrophilicity of rock, the direct emulsion with the following structure applied, % mass.:

| | |
|---|---|
| hydrocarbon phase (oil or diesel fuel) | 20-25, |
| emulsifier (for example, brand Sinol EM or Sinol EMI) | 3-5, |
| colloidal silicon dioxide nanoparticles | 0.5-3, |
| aqueous phase (water solution of $CaCl_2$ or NaCl) | rest. |

The brand Sinol EM™ is a 40% solution of esters of oleic, linoleic, linolenic and resin acids in diesel fuel, with the additives of a high molecular weight organic thermal stabilizer and alkyldimethylamine oxide. Sinol EMI™ is an emulsifier-corrosion inhibitor for oil production, consisting of hydrocarbons and fatty acid amidoamines.

Figure 3:
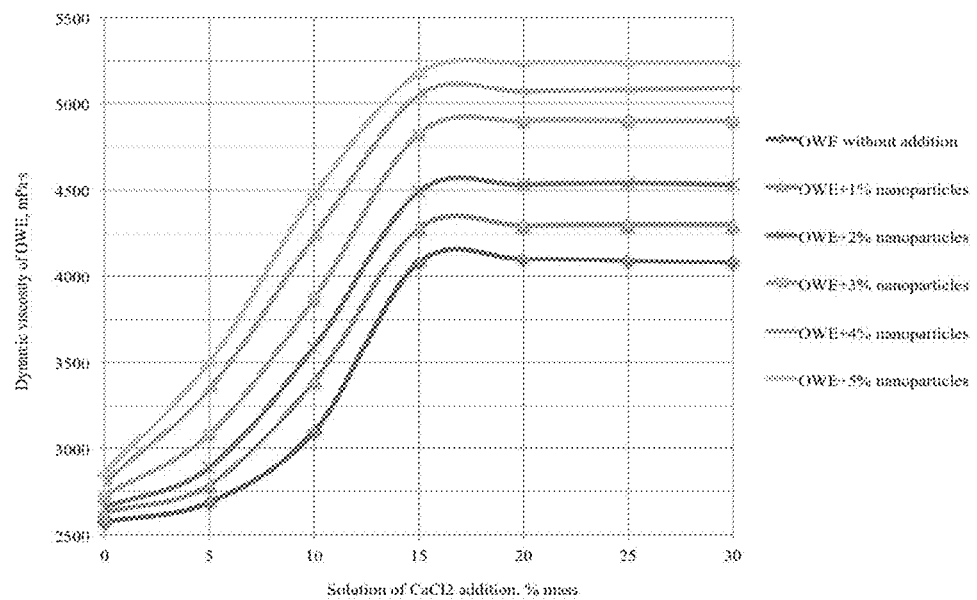
FIG. 3 shows the dependence of the viscosity of the direct emulsion with $SiO_2$ nanoparticles on the content of the mineralized water solution at a spindle rotation speed of 30 rpm.

According to the results of the experiments, graphs of the direct emulsion dynamic viscosity with the different concentration of colloidal silicon dioxide nanoparticles and model of reservoir water were build (FIG. 3).

In the case of the hydrophobicity of rock, the invert emulsion with the following structure applied, % mass.:

| | |
|---|---|
| hydrocarbon phase (oil or diesel fuel) | 40-45, |
| emulsifier (for example, brand Sinol EM or Sinol EMI) | 3-5, |
| colloidal silicon dioxide nanoparticles | 1-3, |
| aqueous phase (water solution of $CaCl_2$ or NaCl) | rest. |

Figure 4:
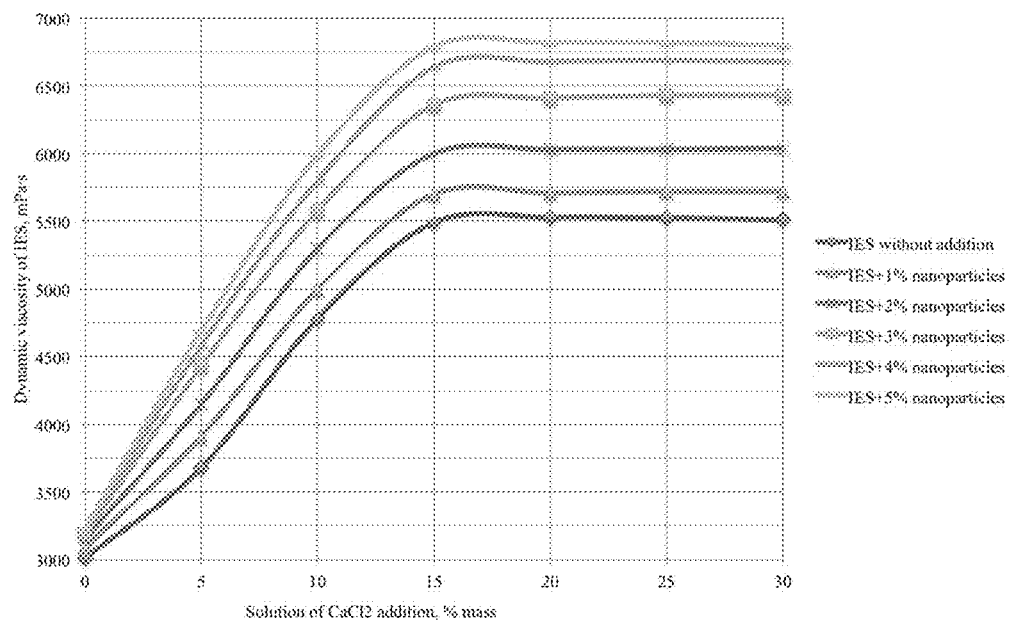
FIG. 4 shows the dependence of the viscosity of the invert emulsion with silicon dioxide ($SiO_2$) nanoparticles on the content of the mineralized water solution at a spindle rotation speed of 30 rpm.

According to the results of the experiments, graphs of the invert emulsion dynamic viscosity with the different concentration of colloidal silicon dioxide nanoparticles and model of reservoir water (water solution of $CaCl_2$) were build (FIG. 4).

Figure 5:
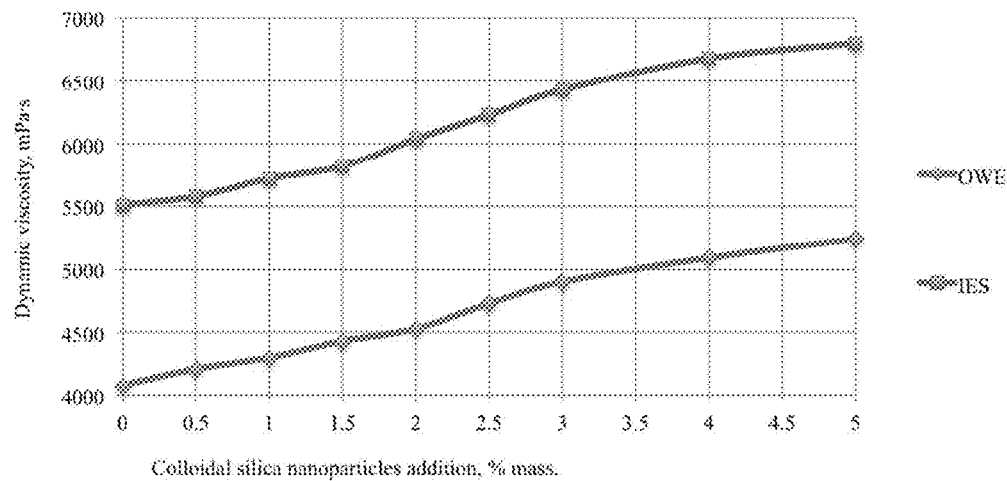
FIG. 5 shows the dependence of the viscosities of the direct and invert emulsion on the content of nanoparticles when mixed with model of reservoir water 30% wt. (spindle speed 30 rpm).

The revealed dependences allow to conclude that the presence of colloidal silicon dioxide nanoparticles in concentration 0.5-3% mass. in the both direct or invert emulsions leads to an increase in the viscosity properties of the emulsion from 4080 to 6800 mPa·s when mixed with 30% mass. models of reservoir water (FIG. 5).

Statistical analysis of the experimental results made it possible to determine the optimal concentration of the colloidal silicon dioxide nanoparticles in the emulsion in the range of 0.5-3% mass.

The study of thermal stability of the samples were carried out in a water bath "LOIP LB-161". As a result of experiments on the thermostability of emulsion samples with additives of model of reservoir water—15% mass. were determined that the samples with a content of the colloidal silicon dioxide nanoparticles in a range 0.5-3% mass. having a highest thermal stability for 48 hours at a temperature of 80° C.

In order to determine the effect of silicon dioxide nanoparticles on the emulsion property to reduce viscosity when interacting with the hydrocarbon phase, experiments were carried out that made it possible to determine the effect of hydrocarbons on the viscosity properties of the developed systems. Hydrocarbons are hydrophobic compounds that are not miscible with water. However, the ability of hydrocarbons to diffuse into the cores of micelles affects their shape, size and, as a result, the rheological properties of emulsions.

For experiments, were selected samples of direct and invert emulsion with 1% mass. of the colloidal silicon dioxide nanoparticles. In each sample were added the model of reservoir water in various volumes, % vol.: 5, 10, 15, 20, 25, 30 respectively. Thus, 12 samples with different content of the model of reservoir water were obtained. Experiments to study the effect of hydrocarbons on the rheological properties of emulsions were made as follows.

Figure 6:
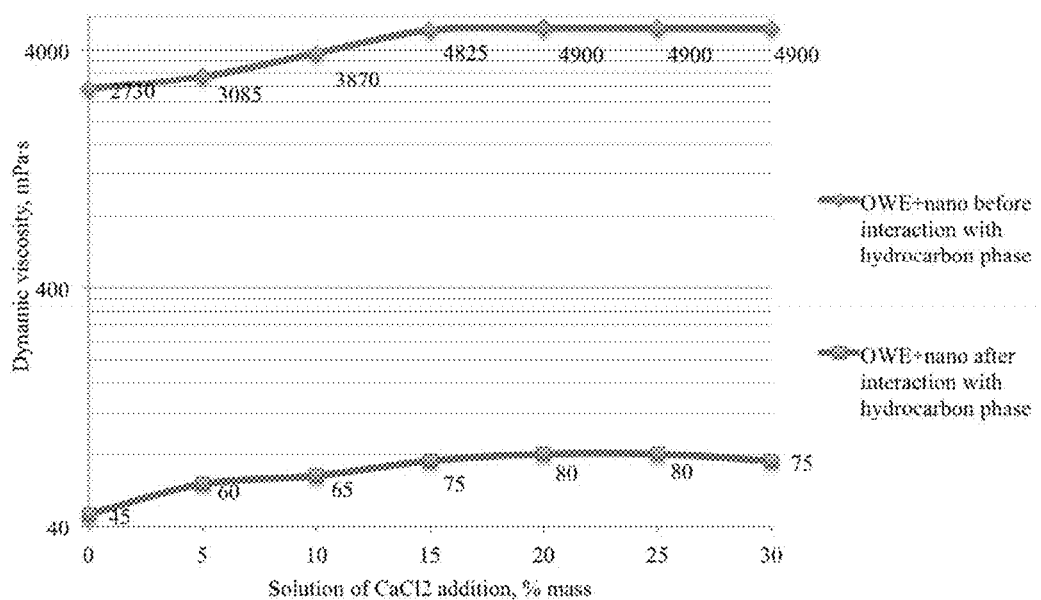
FIG. 6 shows the dynamic viscosity of the direct emulsion with silicon dioxide nanoparticles before and after mixing with the hydrocarbon phase.
Figure 7:
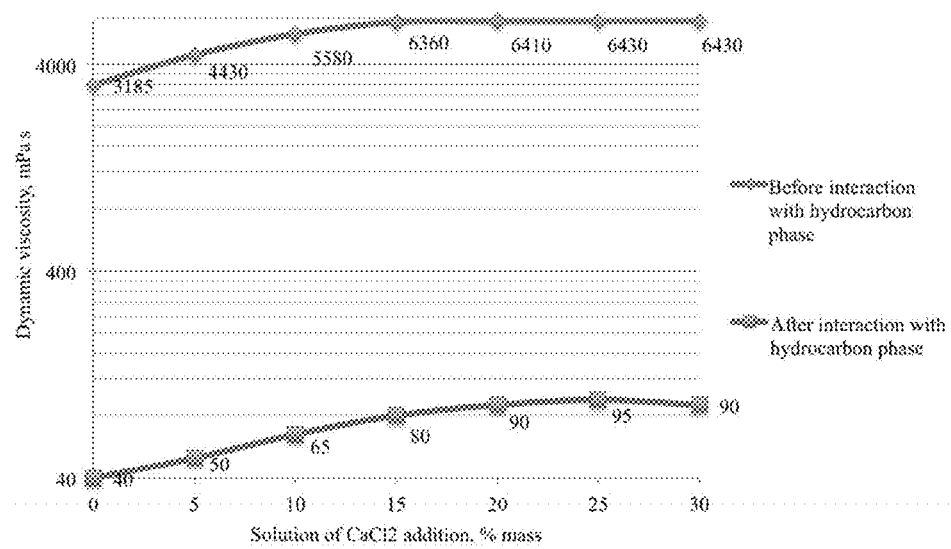
FIG. 7 shows the dynamic viscosity of the invert emulsion with silicon dioxide nanoparticles before and after mixing with the hydrocarbon phase.

The alternately the samples with different contents of the model of reservoir water were mixed with oil (viscosity 22 MPa·s, density 866 kg/m$^3$) in a flask in the ratio of 50 to 20 ml of oil, and shaken for 20 seconds. The resulting sample was kept for 1 h in a water bath at 40° C. After exposure, the phase separation of the system into the upper—hydrocarbon and lower—aqueous phases was observed. After that, the viscosity of the obtained samples was measured on a rotary viscometer at a spindle speed of 30 rpm. The results of the experiments are graphically represented in FIGS. 6 and 7.

According to results of the experiments a high sensitivity of the developed emulsions to hydrocarbons was determined. Mixing with oil leads to a significant decrease in viscosity: from the maximum value—6430 to 90 MPa·s and the minimum value—2730 to 40 MPa·s.

At the final stage of the experiments, each of the samples was filtered through a sieve (cell size 500 μm). High viscosity sediments and single clots were not observed on the sieve.

Thus, the results of experiments confirm the ability of the developed emulsions significantly reduce viscosity when interacting with the hydrocarbon phase, which is a big importance when using the emulsions in the methods for intensification of oil production or enhanced oil recovery.

The ability of the emulsion to selectively block the aquifer intervals of the petroleum reservoir is the main feature and advantage.

At the same time, for the direct emulsion, the most effective the following composition, % mass.:

| | |
|---|---|
| emulsifier (for example, brand Sinol EM or Sinol EMI) | 3-5, |
| hydrocarbon phase (oil or diesel fuel) | 20-25, |
| colloidal silicon dioxide nanoparticles | 0.5-3, |
| aqueous phase (water solution of CaCl$_2$ or NaCl) | rest, | where the colloidal silicon dioxide nanoparticles contains, % mass.:

| | |
|---|---|
| colloidal silicon dioxide in acrylic acid | 40, |
| propylene glycol monomethyl ether | 59.5, |
| water | rest. | for the invert emulsion, the most effective the following composition, % mass.:

| | |
|---|---|
| emulsifier (for example, brand Sinol EM or Sinol EMI) | 3-5, |
| hydrocarbon phase (oil or diesel fuel) | 40-45, |
| colloidal silicon dioxide nanoparticles | 1-3, |
| aqueous phase (water solution of CaCl$_2$ or NaCl) | rest, | where the colloidal silicon dioxide nanoparticles contains, % mass.:

| | |
|---|---|
| colloidal silicon dioxide in acrylic acid | 40, |
| propylene glycol monomethyl ether | 59.5, |
| water | rest. |

The preferred size of silicon dioxide particles is 45 nm.

When implementing the method, it is recommended to use prepared oil from the oil gathering station or diesel fuel as the hydrocarbon phase.

Below is an example of the method.

The analysis of the initial geological and physical information of the targeted interval of the reservoir has been performed. As a result of the analysis, the main geological and physical parameters were determined, including the wettability of the reservoir rock.

The most common method for determining the wettability of petroleum reservoir rock is the optical measurement of the wetting angle by measuring the angle of the meniscus formed on the surface of the rock in the water-hydrocarbon liquid system using modern specialized optical digital technology. If the rock is wetted with water, then the wetting angle θ is almost zero, which is an indicator of the hydrophilicity of the rock. If the rock is wetted with oil, the wetting angle θ approaches 180°, which is an indicator of the hydrophobicity of the rock. On the surface with intermediate wettability, the contact angle depends on the balance of the surface tension forces.

In this example, the wetting angle of rock is almost zero, which is an indicator of the hydrophilicity of the rock (i.e., the rock is wetted with water), on the basis of this the type of emulsion was determined—a direct type.

Before treatment, it is necessary to ensure the cleanliness of the BHZ by carrying out the following technological operations:

Descent of the tubing with a "wash shoe".

Initial flushing of the well with standard flushing solution with a gradual tolerance of tubing to the perforated interval, and lower to the bottom by the flushing fluid, which does not reduce the permeability of the BHZ rocks due to the surfactant content of 1-2% mass.

The funnel is installed on the bottom of the perforation interval.

After all the preparatory operations have been carried out, proceed to the technological operations for the selective treatment of the BHZ:

1) Injection of the emulsion into the tubing string and the packer setting in the following order:

Pumped emulsion to the level of 10-15 m above the top perforations of the targeted interval. The direct emulsion contains, % mass.: emulsifier—3-5, the hydrocarbon phase—20-25, the solution of colloidal silicon dioxide nanoparticles is 0.5-3, the aqueous phase—the rest, where the solution of colloidal silicon dioxide nanoparticles contains, % mass.: colloidal silicon dioxide in acrylic acid—40, propylene glycol monomethyl ether—59.5, water—the rest. An emulsifier of the brand Sinol EM was used, diesel fuel as a hydrocarbon phase, and water solution of calcium chloride as an aqueous phase. The emulsion restricts water inflows by artificial reducing the permeability of highly permeable, water saturated zones.

The packer installed (1-5 m above the upper perforations).

Continued the injection of the remaining volume of the emulsion for the purpose of its further pushing into the targeted interval.

2) An oil pack (rim) of the estimated volume (0.2 t), which is a buffer, was pumped into the tubing string to prevent direct contact between the emulsion and the acid composition (injected next) in the wellbore.

3) Pushed the technological liquids in the tubing string (the emulsion with oil rim) with the calculated volume of the acid composition. An acid composition of the following structure was used: 15% hydrochloric acid, diethylene glycol, acetic acid, amide-based water repellent, corrosion inhibitor, process water.

The acid composition pumped to the level of the tubing end. The pressure during the displacement of the emulsion into the reservoir was set at a level not higher than the safe pressure on the casing.

4) Pushed the liquids in the tubing string (emulsion+oil rim+acid composition) with a water solution with surfactants (2-3% mass.) to the tubing end. As a surfactant can be used water repellents brand ChAS-M or IVV-1.

The acid composition is pushed into the non-working, low-permeable interlayers of the petroleum reservoir, because of high-permeable intervals blocked by emulsion. Displacement of the acid composition into the reservoir was performed with a saline solution with surfactant.

5) Closed the valve on the tubing and keep the well for reaction of the acid with the rock. The exposure time depends on the concentration of hydrochloric acid in the composition. A more accurate time is determined by laboratory methods for dissolving the core of the rock with an acid composition in use.

Carried out the final activities:

1) Swabbing the well in the amount of two volumes of the wellbore to remove reaction products from the reservoir.

2) Lifted the tubing string, the pumping equipment and launched the well into operation.

3) To study the technological effect, performed a complex of hydrodynamic and geophysical studies aimed at determining the coefficient of productivity and the profile of fluid flow in BHZ.

In case of hydrophobicity of the reservoir rock, the method will be carried out similarly, but with the use of invert-emulsion with the following composition, % mass.: hydrocarbon phase—40-45, emulsifier—3-5, colloidal silicon dioxide nanoparticles—1-3, the aqueous phase is the rest.

Thus, the invention provides increased stability of the water-blocking agent applied for complex technology for the intensification of oil production, obtaining additional oil production, enhancement of the efficiency on the wells with high fluid rate by selective blocking the water-bearing intervals.

The invention claimed is:

1. A method for treatment of a bottomhole formation zone, said method comprising the steps of:
    a) determining of wettability of reservoir rocks in the bottomhole formation zone, wherein a direct type of emulsion is used in a case of a condition of hydrophilicity of the reservoir rocks or an invert type of the emulsion is used in a case of a condition of hydrophobicity of the reservoir rocks;
    b) making the emulsion of the direct type with the following composition (% mass.) for treating of the bottomhole formation zone in the case of the condition of hydrophilicity of the reservoir rocks, preliminary determined in step a):
    hydrocarbon phase—20-25,
    emulsifier—3-5,
    colloidal silicon dioxide nanoparticles—0.5-3,
    aqueous phase—the balance,
    or making the emulsion of the invert type with the following composition (% mass) for treating of the bottomhole formation zone in the case of the condition of hydrophobicity of the reservoir rocks, preliminary determined in step a):
    hydrocarbon phase—40-45,
    emulsifier—3-5,
    colloidal silicon dioxide nanoparticles—1-3,
    aqueous phase—the balance:
    c) treating the bottomhole formation zone with an the emulsion of the direct type or with the emulsion of the invert type, obtained in step b), which limiting limits water inflows by artificially reducing permeability of highly permeable intervals of a reservoir,
    d) treating the bottomhole formation zone, specified in step c), with an oil pack, providing a buffer and preventing interaction of the emulsion with an subsequently-injected acid composition;
    e) treating the bottomhole formation zone, specified in step d), with the acid composition.

2. The method according to claim 1, wherein the colloidal silicon dioxide nanoparticles contain, % mass:
    colloidal silicon dioxide in acrylic acid—40,
    propylene glycol monomethyl ether—59.5,
    water—the balance.

3. The method according to claim 1, wherein diesel fuel or oil from an oil gathering station is used as the hydrocarbon phase.

4. The method according to claim 1, wherein a water solution of calcium chloride or sodium chloride is used as the aqueous phase.

5. The method according to claim 1, further comprising using, as the emulsifier, a 40% solution of esters of oleic, linoleic, linolenic and resin acids in diesel fuel with the additives of a high molecular weight organic thermal stabilizer and alkyldimethylamine oxide or an emulsifier-corrosion inhibitor for oil production, consisting of hydrocarbons and fatty acid amidoamines.

* * * * *